United States Patent
Iwamoto

(10) Patent No.: US 7,446,794 B2
(45) Date of Patent: Nov. 4, 2008

(54) IMAGE FORMING APPARATUS

(75) Inventor: Kazuyuki Iwamoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 11/270,567

(22) Filed: Nov. 10, 2005

(65) Prior Publication Data
US 2006/0103716 A1     May 18, 2006

(30) Foreign Application Priority Data
Nov. 12, 2004    (JP)    ............................ 2004-329854

(51) Int. Cl.
*G03G 15/00*    (2006.01)
(52) U.S. Cl. ...................................... 347/241
(58) Field of Classification Search ......... 347/232–233, 347/241, 243, 265, 260–261
See application file for complete search history.

(56) References Cited

U.S. PATENT DOCUMENTS

| | | | | |
|---|---|---|---|---|
| 6,049,350 | A | * | 4/2000 | Yamaguchi .................. 347/241 |
| 6,201,561 | B1 | * | 3/2001 | Ichikawa ..................... 347/241 |
| 6,801,239 | B2 | | 10/2004 | Nakahata ..................... 347/243 |
| 2003/0112316 | A1 | * | 6/2003 | Aruga et al. ................. 347/115 |
| 2003/0210324 | A1 | * | 11/2003 | Sung et al. ................... 347/241 |
| 2004/0174427 | A1 | | 9/2004 | Iwamoto ..................... 347/244 |
| 2005/0093968 | A1 | | 5/2005 | Iwamoto ..................... 347/238 |
| 2006/0103716 | A1 | | 5/2006 | Iwamoto ..................... 347/231 |
| 2006/0250495 | A1 | | 11/2006 | Iwamoto ..................... 347/243 |

FOREIGN PATENT DOCUMENTS

JP          2004-21133          1/2004

* cited by examiner

*Primary Examiner*—Huan H Tran
(74) *Attorney, Agent, or Firm*—Fitzpatrick, Cella, Harper & Scinto

(57) ABSTRACT

The optical path of scanning light E1 reaching the photosensitive drum 82*a* closest to the installation plane S of a plurality of photosensitive drums 82*a*, 82*b*, 82*c*, and 82*d* is provided at the photosensitive drum side with respect to the optical path of scanning light E2 deflected and scanned on the same side as the side of polygon mirror 10 for deflecting and scanning the laser beam, from the polygon mirror 10 to folding mirrors 24, 26. The invention presents a technology capable of equalizing the length of optical paths if the regulation of optical unit in height direction is different at both sides of the rotary polyhedral mirror.

2 Claims, 5 Drawing Sheets

IMAGE FORMING APPARATUS

BACKGROUND OF THE INVENTION

1. Field of the Invention

The present invention relates to an image forming apparatus of electrophotographic system such as copier, printer or facsimile apparatus having a function of forming an image on a sheet or other transfer material (recording medium).

2. Description of the Related Art

Conventionally, in a color image forming apparatus, photosensitive members are used as independent image bearing members for colors of yellow, magenta, cyan and black, and electrostatic latent images are formed by emitting laser light to photosensitive members, these electrostatic latent images are developed by toners of individual colors, obtained toner images are sequentially transferred onto an intermediate transfer belt and overlaid, and transferred in batch on a sheet of recording medium, and a color image is obtained, which is known as a tandem type color image forming apparatus.

In such tandem type color image forming apparatus, a scanning optical device for emitting laser light to photosensitive members comprises a light source for emitting laser light according to image information, a rotary polyhedral mirror for deflecting and scanning the laser light emitted from the light source, an f-theta lens for scanning the laser light deflected and scanned by the rotary polyhedral mirror at uniform speed and forming a spot image on photosensitive member, a folding mirror for reflecting the laser light in predetermined direction, and a beam detection sensor for receiving the laser light reflected by the rotary polyhedral mirror and generating a beam detection signal, which are incorporated in a casing, and the laser light is emitted to the photosensitive member from a slit opening in the casing.

In such scanning type optical device, in order to lower the cost and reduce the size, as exposure means of laser light to photosensitive drums, the rotary polyhedral mirror as deflecting and scanning means is shared by a plurality of light sources, and one rotary polyhedral mirror is used for deflecting and scanning laser lights from the plurality of light sources to expose by emitting to the plurality of photosensitive drums, and in this scanning type optical device, in order to reduce the size, the laser beam is folded within the casing of the scanning type optical device, and the photosensitive members and the scanning type optical device are disposed closely to each other.

Specifically, as disclosed in Japanese Patent Application Laid-Open No. 2004-21133 (patent document 1), in a scanning type optical device for deflecting and scanning laser lights from a plurality of light sources by one rotary polyhedral mirror simultaneously, and exposing by emitting to a plurality of photosensitive drums, the plurality of laser beams from the rotary polyhedral mirror are scanned in an array in remote-close direction to the photosensitive members, and the laser beam closer to the photosensitive member side out of plural laser beams is set away from the photosensitive member so as to cross with other laser beam, and then by emitting to the photosensitive member, the length of optical path is assured.

In the tandem type color image forming apparatus, further reduction of size is demanded, and so as not to increase the dimension in lateral width direction or vertical height direction in the occupied space of image forming unit incorporating independent photosensitive members of yellow, magenta, cyan and black colors, each photosensitive member is inclined to the installation plane of image forming apparatus, and it is designed to expose by the scanning type optical device from the lower side of the photosensitive members.

If attempted to reduce the size in the configuration of patent document 1, for effective utilization of space, limitation in height direction of optical unit differs between both sides of irradiation of laser from rotary polyhedral mirror. That is, since the distance is shorter between the photosensitive member and the mirror for folding the laser folded in a direction departing from the photosensitive member toward the photosensitive member, the position of folding mirror cannot be set sufficiently apart from the photosensitive member, and, as a result, sufficient length of optical path is not assured in such region.

SUMMARY OF THE INVENTION

It is hence an object of the invention to present a technology capable of equalizing the length of optical path if limitation in height direction of optical unit differs between both sides of rotary polyhedral mirror.

According to another object of the invention, there is provided an image forming apparatus comprising:

a plurality of image bearing members; and an optical unit including a rotary polyhedral mirror disposed on a specified surface of a casing incorporating the plurality of image bearing members and image forming apparatus, for deflecting and scanning a plurality of laser beams, and image focusing optical means for focusing the plurality of laser beams deflected and scanned by the rotary polyhedral mirror on the plurality of image bearing members along the individual optical paths; said optical unit having a first reflection member for reflecting the laser beam deflected and scanned by the rotary polyhedral mirror in a direction away from the image bearing member, and a second reflection member for reflecting the laser beam reflected by the first reflection member toward the image bearing member, provided in each optical path, wherein the optical path of the laser beam reaching the image bearing member closest to the specified surface out of the plurality of image bearing members is provided at the image bearing member side with respect to the optical path of other laser beam deflected and scanned on the same side as the side of the rotary polyhedral mirror for deflecting and scanning the laser beam from the rotary polyhedral mirror to the first reflecting member.

Further objects of the invention will be clarified in the following explanation.

DETAILED DESCRIPTION OF THE PREFERRED EMBODIMENT

Figure 1:
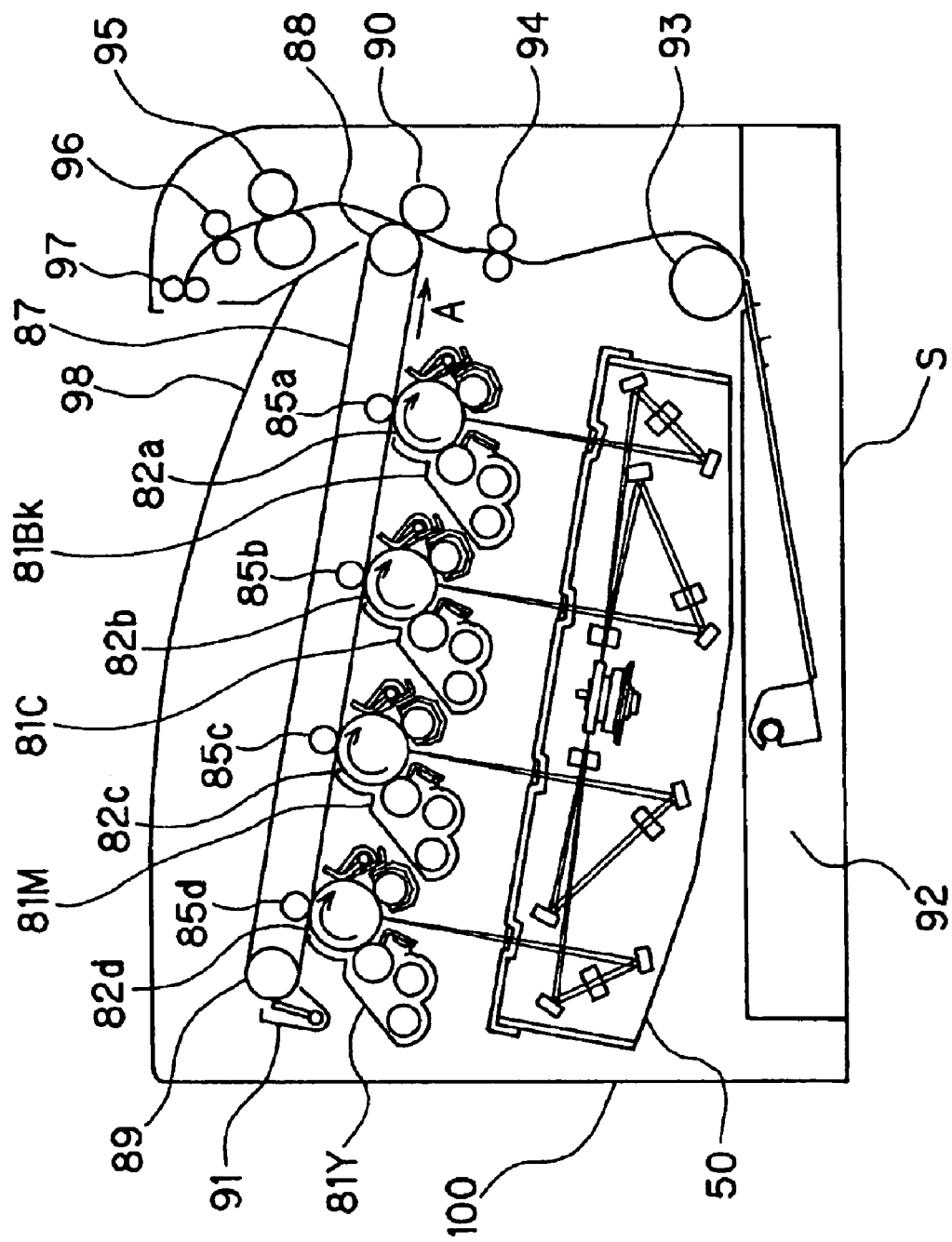
FIG. 1 is a schematic sectional view of image forming apparatus according to an embodiment of the invention.

Referring now to the drawings, the best mode for carrying out the invention is specifically described below by way of example. Dimensions, materials, shapes, and relative configuration of constituent components mentioned in the following embodiment are not definitive, but may be changed properly depending on the constitution of the apparatus in which the invention is applied and other various condition, and it is not intended to limit the scope of the invention to only to the following embodiment.

Figure 2:
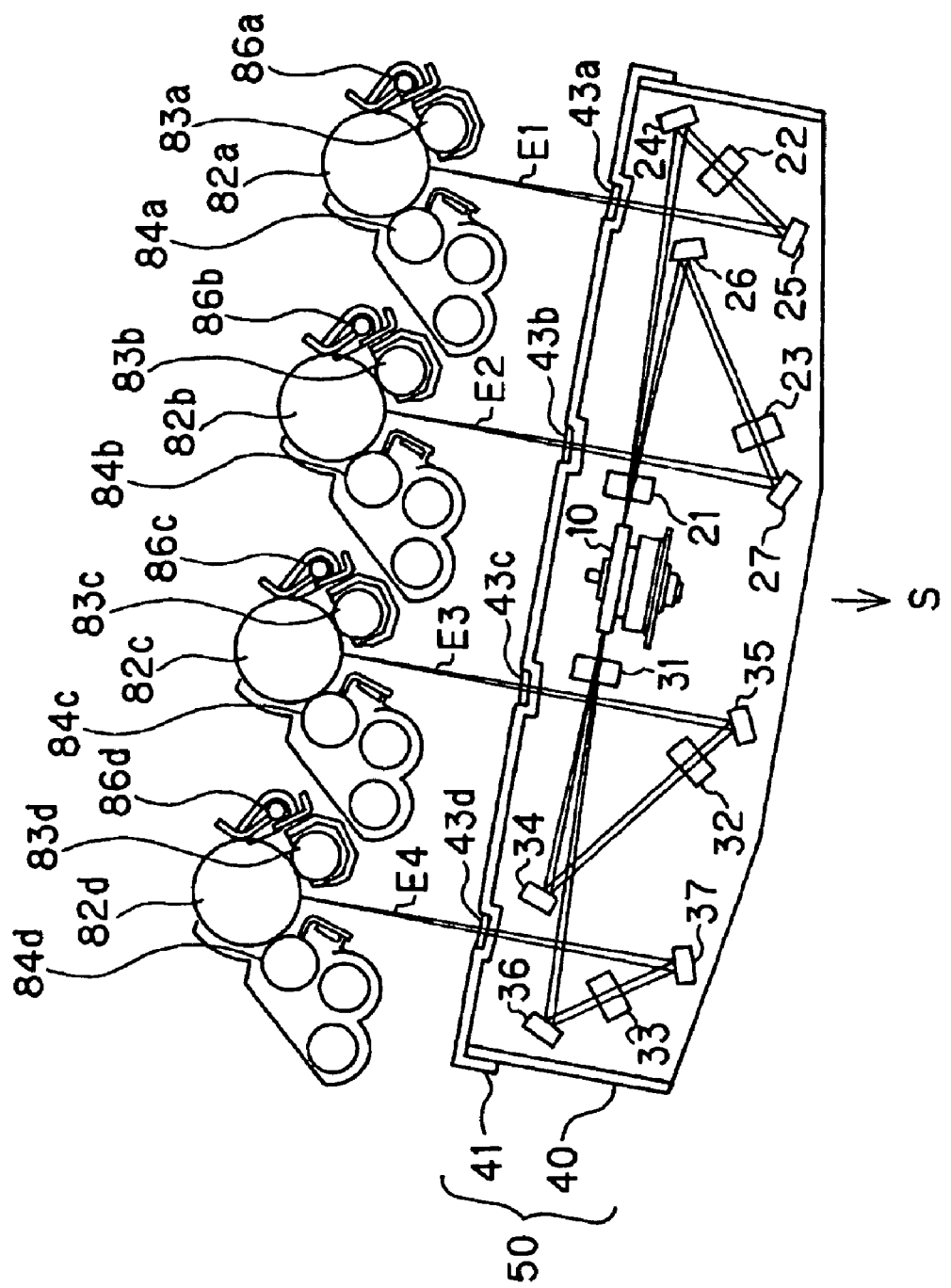
FIG. 2 is a schematic sectional view of scanning type optical device and image forming unit of image forming apparatus according to an embodiment of the invention.
Figure 3:
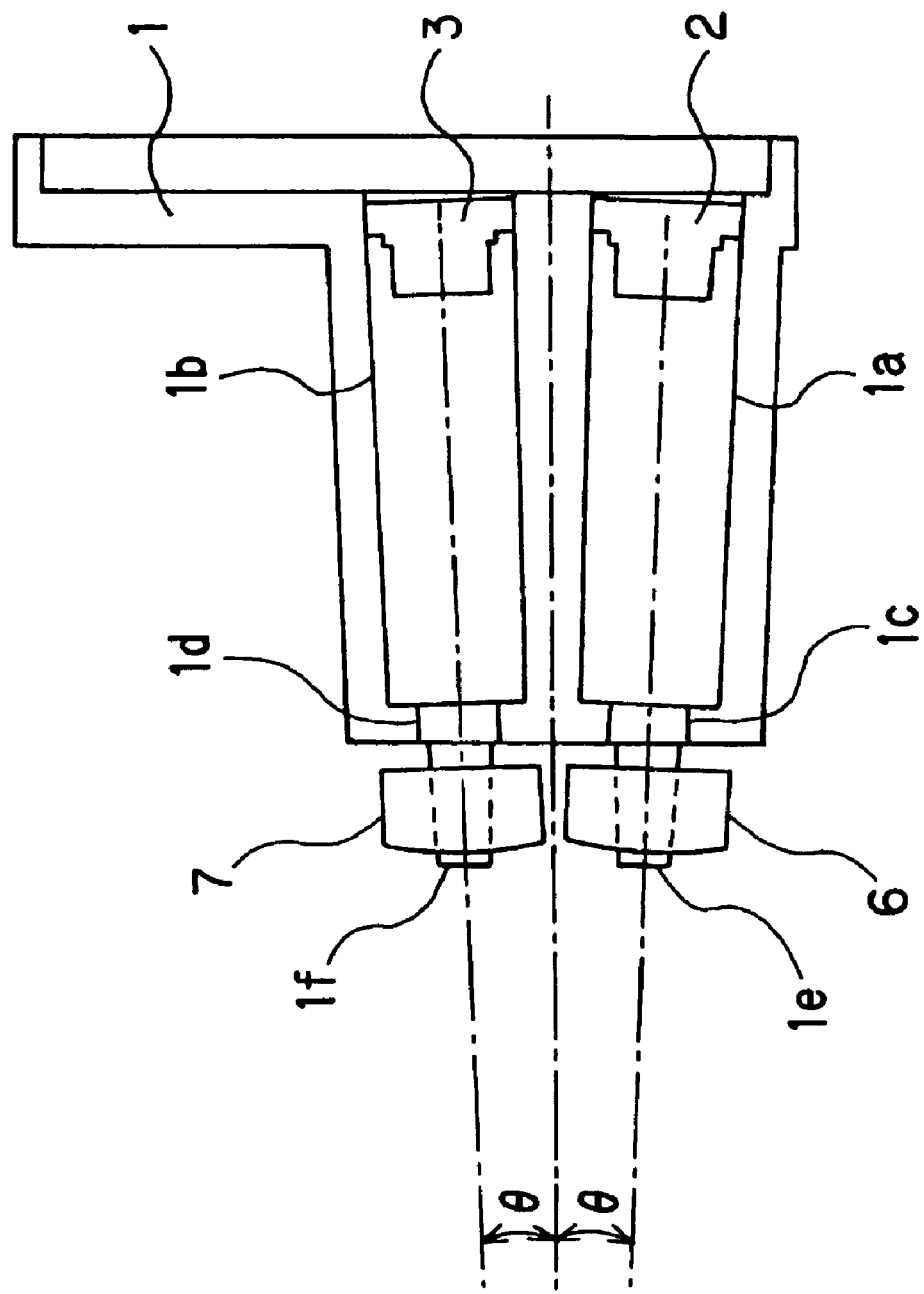
FIG. 3 is a schematic sectional view of laser holder of scanning type optical device according to an embodiment of the invention.
Figure 4:
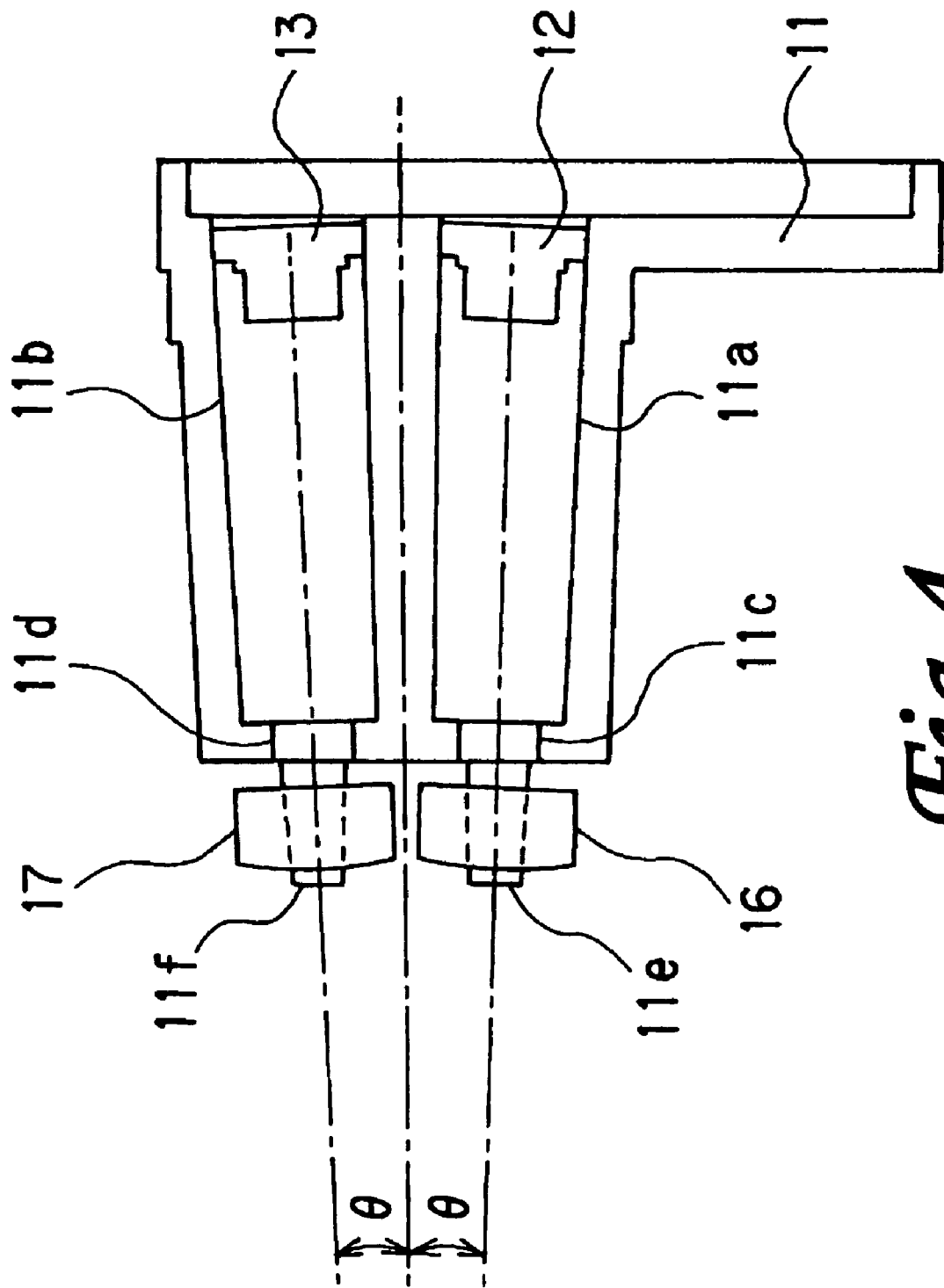
FIG. 4 is a schematic sectional view of laser holder of scanning type optical device according to an embodiment of the invention.

FIG. 1 is a schematic sectional view of tandem type color printer 100 as image forming apparatus according to an embodiment of the invention, FIG. 2 is a schematic sectional view of scanning type optical device 50 as a scanning optical unit and image forming unit 81 of the color printer 100, and FIGS. 3 and 4 are schematic sectional views of laser holder of the scanning type optical device 10.

First, the color printer 100 is explained.

The color printer 100 comprises four image forming units 81, that is, image forming unit 81Bk for forming a black image, image forming unit 81C for forming a cyan image, image forming unit 81M for forming a magenta image, and image forming unit 81Y for forming a yellow image. These four image forming units 81Bk, 81C, 81M and 81Y are disposed at a specific interval in a row at an inclination to installation plane S (specified side of casing) for installing the color printer 100, with the image forming unit 81Bk closest to the installation plane S.

Accordingly, the occupied space of image forming units is not increased in the lateral width direction or vertical height direction, and the color printer 100 can be reduced in size.

In the image forming units 81Bk, 81C, 81M and 81Y, drum-like photosensitive members (hereinafter referred to as photosensitive drums) 82a, 82b, 82c, and 82d are disposed respectively as image bearing members. Since the image forming units are inclined to the installation plane S, the photosensitive drums are also inclined to the installation plane S. In other words, the photosensitive drums are disposed parallel at inclination to the installation plane S so that the distance from the installation plane S may be smaller or larger gradually.

Around the photosensitive drums 82a, 82b, 82c, and 82d, primary chargers 83a, 83b, 83c, and 83d, developing devices 84a, 84b, 84c, and 84d, transfer rollers as transfer means 85a, 85b, 85c, and 85d, and drum cleaner devices 86a, 86b, 86c, and 86d are disposed, and a scanning type optical device 50 is installed beneath the primary chargers 83a, 83b, 83c, and 83d, and the developing devices 84a, 84b, 84c, and 84d.

In the developing devices 84a, 84b, 84c, and 84d, black toner, cyan toner, magenta toner, and yellow toner are contained respectively.

The photosensitive drums 82a, 82b, 82c, and 82d have photoconductive layers on aluminum drum substrates which are OPC photosensitive members of negative charge, and are rotated and driven at specified process speed in arrow direction (clockwise direction in FIG. 1) by means of drive device (not shown).

The primary chargers 83a, 83b, 83c, and 83d as primary charging means uniformly charge the surface of photosensitive drums 82a, 82b, 82c, and 82d at a specified potential of negative polarity by charge bias applied from charge bias power source (not shown).

The developing devices 84a, 84b, 84c, and 84d contain toners, and supply toners of individual colors on electrostatic latent images formed on the photosensitive drums 82a, 82b, 82c, and 82d, and develop (visualize) as toner images.

The transfer rollers 85a, 85b, 85c, 85d as transfer means contact with the photosensitive drums 82a, 82b, 82c, and 82d by way of an intermediate transfer belt 87 at each primary transfer nip.

The drum cleaner devices 86a, 86b, 86c, and 86d have cleaning blades or the like for removing residual toners remaining after primary transfer on photosensitive drums from the photosensitive drums.

The intermediate transfer belt 87 is stretched between a pair of belt conveying rollers 88 and 89, and is rotated (moved) in arrow A direction (counterclockwise direction in FIG. 1). The intermediate transfer belt 87 is composed of dielectric resin, such as polycarbonate, polyethylene terephthalate resin film, or polyvinylidene fluoride resin film.

The belt conveying roller 88 contacts with secondary transfer roller 90 by way of intermediate transfer belt 87, and forms a secondary transfer unit. Near the belt conveying roller 89 outside the intermediate transfer belt 87, a belt cleaning device 91 is installed for removing and collecting residual toners remaining after transfer on the surface of intermediate transfer belt 87.

Reference numeral 92 denotes a sheet cassette storing transfer members as recording medium sheets, and transfer members in the sheet cassette 92 are supplied sheet by sheet by a sheet feeding roller 93, and conveyed up to registration roller pair 94, and once stopped, and conveyed again by adjusting the timing so that the toner image may be transferred to specified position at the secondary transfer unit.

After the toner images are transferred at the secondary transfer unit, the toner images of the transfer member are heated and fixed by a fixing unit 95, and the transfer member is conveyed and discharged on a discharge tray 98 by means of conveying roller pair 96 and discharge roller pair 97.

Next, the scanning optical device 50 is explained.

In the scanning optical device 50, reference numeral 1 denotes a laser holder, which presses and holds semiconductor lasers (single-beam lasers) 2 and 3 which are light source in mirror barrel holders 1a and 1b.

The mirror barrel holders 1a and 1b are installed by inclining the optical axes so that optical paths of semiconductor lasers 2 and 3 may intersect near a polygon mirror 10 at a specified angle θ in sub-scanning direction, and outside parts of mirror barrels are integrally formed. Accordingly, the semiconductor lasers 2 and 3 can be held at a close interval.

At the leading ends of mirror barrel holders 1a and 1b, irises 1c and 1d are provided corresponding to semiconductor lasers 2 and 3, and laser beams emitted from the semiconductor lasers 2 and 3 are formed in a desired optimum beam shape.

At the leading ends of mirror barrel holders 1a and 1b, further, bond units 1e and 1f of collimator lenses 6 and 7 for converting the laser beams passing through the irises 1c and 1d into nearly parallel laser beams are provided at two positions each in the main scanning direction.

The collimator lenses 6 and 7 adjust the irradiation position and focus while detecting the optical characteristics of laser lights, and when the position is determined, they are adhered and fixed to the bond units 1e and 1f by irradiating ultraviolet curing adhesive with ultraviolet rays.

Reference numeral 40 denotes an optical case for storing optical parts of the scanning type optical device 50, and the side wall of the optical case 40 has a fitting hole and a slot for positioning the laser holder 1 provided in sub-scanning direction, and fitting parts provided in the outside of the mirror barrel holders 1a and 1b of the laser holder 1 are fitted and set in place.

Since the laser holder 1 is installed in the optical case 40 by fitting with the fitting parts provided in the outside of the mirror barrel holders 1a and 1b forming optical paths by holding the semiconductor lasers 2 and 3, the relative positions of the semiconductor lasers 2 and 3 and optical parts contained in the optical case 40 are guaranteed at high precision.

Reference numeral 11 denotes a laser holder, which is identical with the laser holder 1, and semiconductor lasers 12 and 13 are pressed and held in mirror barrel holders 11a and 11b. The mirror barrel holders 11a and 11b are installed by inclining the optical axes so that optical paths of semiconductor lasers 12 and 13 may intersect near a polygon mirror 10 at a specified angle θ in sub-scanning direction, and outside parts of mirror barrels are integrally formed.

At the leading ends of mirror barrel holders 11a and 11b, irises 11c and 11d are provided corresponding to semiconductor lasers 12 and 13, and laser beams emitted from the semiconductor lasers 12 and 13 are formed in a desired optimum beam shape.

At the leading ends of mirror barrel holders 11a and 11b, further, bond units 11e and 11f of collimator lenses 16 and 17 for converting the laser beams passing through the irises 11c and 11d into nearly parallel laser beams are provided at two positions each in the main scanning direction.

The collimator lenses 16 and 17 are similar to the collimator lenses 6 and 7, adjust the irradiation position and focus, and are adhered and fixed to the bond units 11e and 11f.

Since the laser holder 11 is positioned in the optical case 40 same as the laser holder 1, the relative positions of the semiconductor lasers 12 and 13 and optical parts contained in the optical case 40 are guaranteed at high precision.

Reference numeral 10 denotes a polygon mirror as rotary polyhedral mirror, and by rotating a motor (not shown) at a constant speed, the laser beam emitted from the semiconductor laser is deflected and scanned. Since the semiconductor lasers 2, 12 enter the polygon mirror 10 obliquely at an angle θ in sub-scanning direction from downside (installation plane S side in this embodiment) to upside (photosensitive drum side in this embodiment), when deflected and scanned by the polygon mirror 10, they are injected to upside at an angle θ in sub-scanning direction. That is, laser beams are at the photosensitive drum side.

On the other hand, since semiconductor lasers 3, 13 enter the polygon mirror 10 obliquely at an angle θ in sub-scanning direction from upside to downside, when deflected and scanned by the polygon mirror 10, they are injected to downside at an angle θ in sub-scanning direction. That is, laser beams are at the installation plane S side.

Reference numeral 21 denotes a first image focusing lens, and together with second image focusing lenses 22, 23, it is an Fθ lens for scanning laser lights emitted from semiconductor lasers 2, 3 at uniform speed, and forming a spot image on photosensitive drum, and the first image focusing lens 21 is composed of a cylinder lens because laser beams emitted from the semiconductor lasers 2, 3 enter at mutually different angles, and in the sub-scanning direction, images are formed by second image focusing lens 22 disposed in relation to laser beam from semiconductor laser 2 and third image focusing lens 23 disposed in relation to laser beam from semiconductor laser 3.

Reference numerals 24 to 27 denote folding mirrors for reflecting the laser beams in specified directions. Reference numeral 24 denotes a folding mirror disposed in relation to laser beam from semiconductor laser 2, and 25 denotes a final folding mirror disposed in relation to laser beam from semiconductor laser 2.

Reference numeral 26 denotes a folding mirror for separation disposed in relation to laser beam from semiconductor laser 3, and it is chamfered in order to avoid interference with laser beam from semiconductor laser 2 when separating from laser beam from semiconductor laser 2. Reference numeral 27 denotes a final folding mirror disposed in relation to laser beam from semiconductor laser 3.

The optical path of laser beam from semiconductor laser 2 (scanning light E1) emitted to photosensitive drum 82a disposed most closely to installation plane S to reach the folding mirror 24 after being deflected and scanned by the polygon mirror 10 is disposed at the photosensitive drum side, with respect to the optical path of laser beam from semiconductor laser 3 (scanning light E2) to reach the folding mirror for separation 26 after being deflected and scanned by the polygon mirror 10.

The first image focusing lens 21, second image focusing lenses 22, 23, and folding mirrors 24 to 27 compose image focusing optical means according to the invention, the folding mirrors 24 and 26 compose first reflection member according to the invention, and the folding mirrors 25 and 27 compose second reflection member according to the invention.

Thus, the laser beams are once reflected to the installation plane S side opposite to the photosensitive drums by the folding mirrors 24 and 26, and then folded toward the photosensitive drums by the final folding mirrors 25 and 27, hence by effectively utilizing a limited space, the scanning type optical device 50 can be installed near the photosensitive drums while keeping the laser beams from semiconductor lasers 2 and 3 at same optical path length.

Further, after being deflected and scanned by the polygon mirror 10, the laser beam from semiconductor laser 2, that is, the laser beam at the photosensitive drum side is emitted to the photosensitive drum 82a closest to the installation plane S, and positions of folding mirror 24 and final folding mirror 25 are set closer to the photosensitive drum 82a, and the projecting extent at the installation plane S side of the scanning type optical device 50 is small, so that the color printer 100 may be reduced in thickness.

On the other hand, at the opposite side of the polygon mirror 10, first image focusing lens 31 and second image focusing lenses 32, 33 corresponding to semiconductor lasers 12, 13, folding mirror 34 and final folding mirror 35 corresponding to laser beam from semiconductor laser 12, and folding mirror for separation 36 and final folding mirror 37 corresponding to laser beam from semiconductor laser 13 are disposed.

The optical path of laser beam from semiconductor laser 13 (scanning light E4) emitted to photosensitive drum 82d disposed most far from installation plane S to reach the folding mirror 36 after being deflected and scanned by the polygon mirror 10 is disposed at the installation plane S side, with respect to the optical path of laser beam from semiconductor laser 12 (scanning light E3) to reach the folding mirror 34 after being deflected and scanned by the polygon mirror 10.

The first image focusing lens 31, second image focusing lenses 32, 33, and folding mirrors 34 to 37 compose image focusing optical means according to the invention, the folding mirrors 34 and 36 compose first reflection member according to the invention, and the folding mirrors 35 and 37 compose second reflection member according to the invention.

Thus, the laser beams are once reflected to the installation plane S side opposite to the photosensitive drums by the folding mirrors 34 and 36, and then folded toward the photosensitive drums by the final folding mirrors 35 and 37, hence by effectively utilizing a limited space, the scanning type optical device 50 can be installed near the photosensitive drums while keeping the laser beams from semiconductor lasers 12 and 13 at same optical path length.

Further, after being deflected and scanned by the polygon mirror 10, the laser beam from semiconductor laser 13, that is, the laser beam at the installation plane S side is emitted to the photosensitive drum 82d remotest from the installation plane S, and therefore since the laser beam from semiconductor laser 12 is at the photosensitive drum side than the laser beam from semiconductor laser 13 after being deflected and scanned by polygon mirror 10, when reflecting the laser beam by folding mirror 34 once to the installation plane S side opposite to the photosensitive drum, chamfering is not required in the folding mirror 34 for preventing interference with laser beam from semiconductor laser 13. As a result, the cost is lower as compared with the above case of installing image focusing optical means 21 to 27 symmetrically to the polygon mirror 10.

In any direction of emission of laser beam, the reflection member 26 and reflection member 24 can be composed, but in this case, chamfering is needed at both sides for preventing interference of first reflection member 26 closer to the rotary polyhedral mirror, and the structure is complicated and it is not preferred.

Reference numeral 41 denotes an upper lid, and it is provided in the optical case 40, and seals the scanning type optical device 50 to prevent entry of dust and toner particles into the scanning type optical device 50.

The upper lid 41 has slit-like openings at positions corresponding to photosensitive drums 82a, 82b, 82c, 82d, and transparent dustproof glass members 43a, 43b, 43c, and 43d are provided. Thus, through dustproof glass members 43a, 43b, 43c, and 43d, scanning light can be emitted to the photosensitive drums 82a, 82b, 82c, and 82d, but entry of dust and toner particles into the scanning type optical device 50 can be prevented.

The next explanation is about flow of operation until the laser beams emitted from semiconductor lasers 2, 3, 12, and 13 are emitted to the photosensitive drums 82a, 82b, 82c, and 82d as scanning lights E1, E2, E3, and E4.

The laser beams emitted from semiconductor lasers 2, 3 (scanning lights E1, E2) are limited in the size of laser beam section by irises 1c, 1d of laser holder 1, and converted into nearly parallel laser beams by collimator lenses 6, 7, and put into a cylindrical lens (not shown).

The laser beams entering the cylindrical lens (scanning lights E1, E2) directly pass through in the main scanning section, and are converged in the sub-scanning section, and focused as nearly line images on a same surface of the polygon mirror 10. At this time, they are put in obliquely so as to intersect near the polygon mirror 10 at an angle θ in sub-scanning direction.

While being deflected and scanned by rotation of polygon mirror 10, the beams are ejected in the sub-scanning direction at an angle θ. Of the two laser beams (scanning lights E1, E2) ejected from the polygon mirror 10, the laser beam from semiconductor laser 2 is received by a BD sensor (not shown). The BD sensor detects the laser beam from the semiconductor laser 2, and issues a synchronous signal, and adjusts the timing of scanning start positions at image end positions by semiconductor lasers 2, 3.

Since the semiconductor lasers 2, 3 are provided in one laser holder 1 in sub-scanning direction, the timing of scanning start position of image end portion by the semiconductor laser 3 is same as the timing of the semiconductor laser 2. The laser beams emitted from the semiconductor lasers 2, 3 after adjustment of timing pass through the first image focusing lens 21.

Later, the laser beam emitted from the semiconductor laser 2 is reflected to downside by the folding mirror 24, passes through the second image focusing lens 22, reflected by the final folding mirror 25, passes through the dustproof glass 43a, and emitted to the photosensitive drum 82a as scanning light E1.

On the other hand, the laser beam emitted from the semiconductor laser 3 is reflected to downside by the folding mirror for separation 26, passes through the second image focusing lens 23, reflected by the final folding mirror 27, passes through the dustproof glass 43b, and emitted to the photosensitive drum 82b as scanning light E2.

The laser beams emitted from the semiconductor lasers 12, 13 (scanning lights E3, E4) are limited in the size of laser beam section by irises 11c, 11d of laser holder 11, and converted into nearly parallel laser beams by collimator lenses 16, 17, and put into a cylindrical lens (not shown).

The laser beams entering the cylindrical lens (scanning lights E3, E4) directly pass through in the main scanning section, and are converged in the sub-scanning section, and focused as nearly line images on a same surface of the polygon mirror 10. At this time, they are put in obliquely so as to intersect near the polygon mirror 10 at an angle θ in sub-scanning direction.

While being deflected and scanned by rotation of polygon mirror 10, the beams are ejected in the sub-scanning direction at an angle θ. Of the two laser beams (scanning lights E3, E4) ejected from the polygon mirror 10, the laser beam emitted from semiconductor laser 12 and reflected by the polygon mirror 10 is received by a BD sensor (not shown). The BD sensor detects the laser beam from the semiconductor laser 12, and issues a synchronous signal, and adjusts the timing of scanning start positions at image end positions by semiconductor lasers 12, 13.

Since the semiconductor laser 12, 13 are provided in one laser holder 11 in sub-scanning direction, the timing of scanning start position of image end portion by the semiconductor laser 13 is same as the timing of the semiconductor laser 12. The laser beams emitted from the semiconductor lasers 12, 13 after adjustment of timing pass through the first image focusing lens 31.

Later, the laser beam emitted from the semiconductor laser 12 is reflected to downside by the folding mirror for separation 34, passes through the second image focusing lens 32, reflected by the final folding mirror 35, passes through the dustproof glass 43c, and emitted to the photosensitive drum 82c as scanning light E3.

On the other hand, the laser beam emitted from the semiconductor laser 13 is reflected to downside by the folding mirror 36, passes through the second image focusing lens 33, reflected by the final folding mirror 37, passes through the dustproof glass 43d, and emitted to the photosensitive drum 82d as scanning light E4.

The image forming operation in the color printer 100 is described below.

When a print start signal is entered, laser beams are emitted from the scanning type optical device 50 according to the image: information to the photosensitive drums 82a, 82b, 82c, and 82d as scanning lights. The procedure up to exposure of laser beams is same as the flow of laser beams emitted from the semiconductor lasers 2, 3, 12, and 13 until exposed to the photosensitive drums 82a, 82b, 82c, and 82d as scanning lights E1, E2, E3, and E4, and the explanation is not repeated here.

In image forming operation, as the photosensitive drums 82a, 82b, 82c, and 83d are exposed, electrostatic latent images are formed on the photosensitive drums 82a, 82b, 82c, and 82d charged by the primary chargers 83a, 83b, 83c, and 83d.

The color toners frictionally charged in the developing devices 84a, 84b, 84c, 84d are applied to the electrostatic latent images, and toner images are formed on the photosensitive drums 82a, 82b, 82c, and 82d, and further the toner images are transferred from the photosensitive drums 82a, 82b, 82c, and 82d onto the intermediate transfer belt 87 by means of primary transfer nips.

Transfer members are supplied sheet by sheet from the sheet cassette 92 by means of sheet feeding roller 93, and conveyed up to registration roller pair 94, and once stopped, and conveyed again by adjusting the timing so that the toner images may be transferred to specified position at the secondary transfer unit.

At the secondary transfer unit, by transferring the toner images again from the intermediate transfer belt 87 onto the transfer member, the images are formed on the transfer member. After the images are formed on the transfer member, the toner images are heated and fixed by a fixing unit 95, and the transfer member is conveyed and discharged on a discharge tray 98 by means of conveying roller pair 96 and discharge roller pair 97.

As explained herein, by using one polygon mirror 10, laser lights emitted from plural semiconductor lasers 2, 3, 12, and 13 are deflected and scanned simultaneously, and emitted to plural photosensitive drums 82a, 82b, 82c, and 82d to expose, and at this time the laser beam to the photosensitive drum 82a closest to the installation plane S of the color printer 100 is deflected by the polygon mirror 10 and scans to pass at the photosensitive drum side, and therefore the folding mirror 24 and final folding mirror 25 can be disposed closely to the photosensitive drum 82a, and projection of scanning type optical device 50 to the installation plane S side is suppressed, so that an image forming apparatus of thin structure is realized.

Moreover, after being deflected and scanned by the polygon mirror 10, the laser beam from semiconductor laser 13, that is, the laser beam at installation plane S side is emitted to the photosensitive drum 82d remotest from the installation plane S side, and therefore after the laser beam from the semiconductor laser 12 is deflected and scanned by the polygon mirror 10, it is at the photosensitive drum side from the laser beam of the semiconductor laser 13, and when once reflecting the laser beam to the installation plane S side opposite to the photosensitive drum by the folding mirror 34, chamfering is not needed in the folding mirror 34 for prevention of interference with laser beam of semiconductor laser 13. Accordingly, the cost is lower as compared with the case of installing image focusing optical means 21 to 27 symmetrically to the polygon mirror 10.

Further, since the optical paths of semiconductor lasers 2, 3 and semiconductor lasers 12, 13 are provided by inclining the optical axes mutually so as to intersect near the polygon mirror 10 at a specified angle θ in sub-scanning direction, the laser beam to the photosensitive drum 82a closest to the installation plane S of the color printer 100, after being deflected by the polygon mirror 10, is closer to the photosensitive drum side, and therefore the folding mirror 24 and final folding mirror 25 can be disposed closer to the photosensitive drum 82a, and projection of scanning type optical device 50 to the installation plane S side is suppressed, so that an image forming apparatus of thinner structure is realized.

The semiconductor lasers 2, 3, 12, and 13 are single lasers having one light emitting point in one casing, but semiconductor lasers having a plurality of light emitting points in one casing may be also used, and in that case the number of scanning lines for manipulating the photosensitive drums is increased proportionally, and it is suited to faster writing.

In this embodiment, the optical paths of semiconductor lasers 2, 3 and semiconductor lasers 12, 13 are provided by inclining the optical axes mutually so as to intersect near the polygon mirror 10 at a specified angle θ in sub-scanning direction to realize oblique incident structure, but a parallel incident structure may be also formed without specifying angle in sub-scanning direction. In such a case, however, since the laser beam to the photosensitive drum 82a closest to the installation plane S of the color printer 100, after being deflected by the polygon mirror 10, is scanned parallel to the photosensitive drum, the folding mirror 24 and final folding mirror 25 can be disposed much closer to the photosensitive drum 82a in the case of oblique incident structure, and projection of scanning type optical device 50 to the installation plane S side is suppressed, so that an image forming apparatus of thinner structure is realized.

This embodiment is explained in the configuration of downside exposures but the invention may be also realized in upside exposure structure having exposure units on the upside of the image bearing members.

Figure 5:
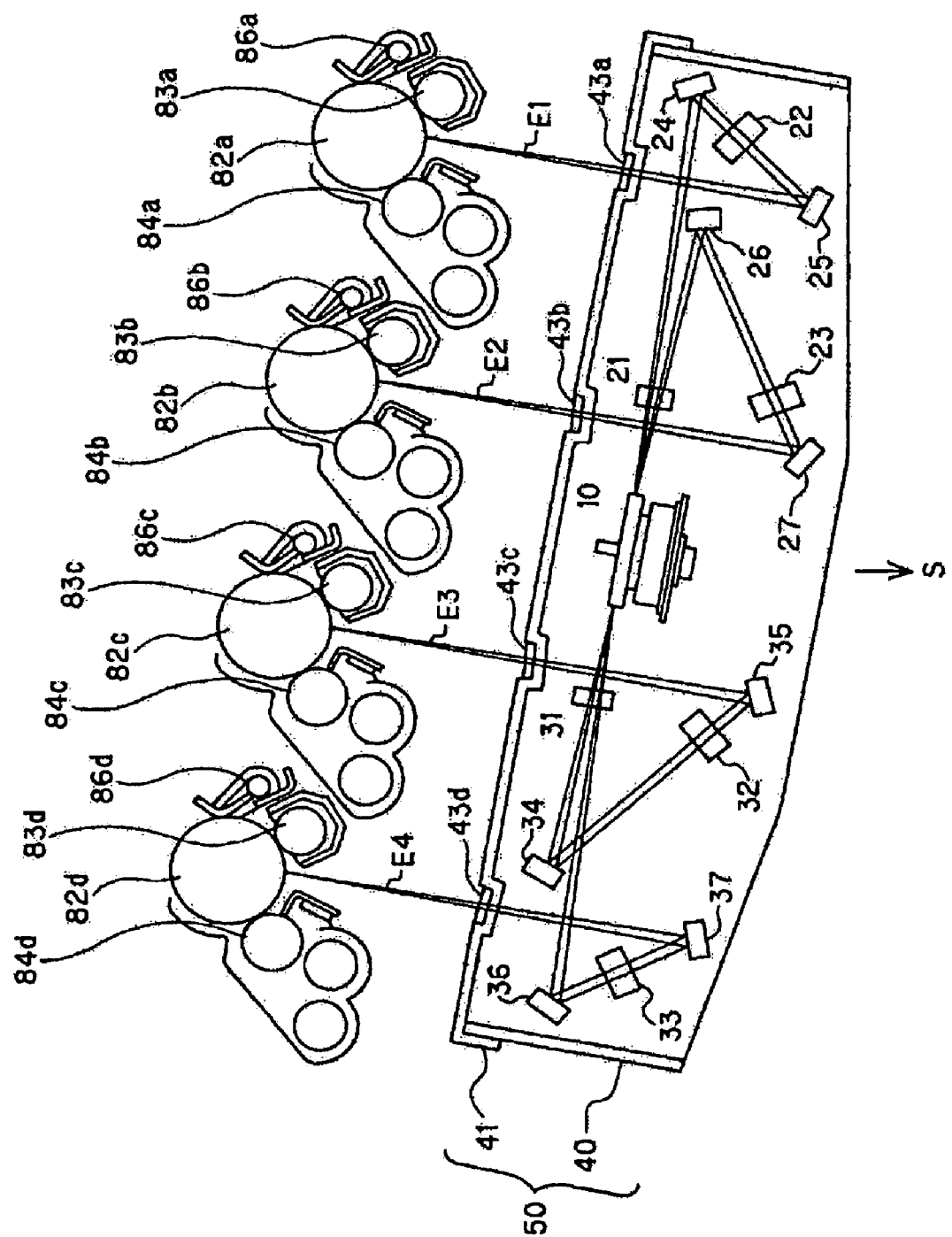
FIG. 5 is a schematic sectional view of scanning type optical device and image forming unit in other system according to an embodiment of the invention.

FIG. 5 shows a configuration differing in the position of first image focusing lens from the foregoing embodiment. By forming this image focusing lens between image bearing members (between 82a and 82b, between 82c and 82d), the drum distance of 82b and 82c can be shortened. The configuration of the invention may be similarly applied in such optical unit.

According to the invention, a plurality of image bearing members are formed in parallel, and laser beams are emitted to both sides of rotary polyhedral mirror, and in this image forming apparatus, if the layout of folding mirrors to image bearing members at both sides of rotary polyhedral mirror is different, the optical paths can be equalized in length.

The invention is explained so far by referring to a present embodiment, but the invention is not limited to the illustrated embodiment alone, but may be changed and modified in various forms within the technical scope of the invention.

This application claims priority from Japanese Patent Application No. 2004-329854 filed Nov. 12, 2004, which is hereby incorporated by reference, herein.

What is claimed is:

1. An image forming apparatus comprising:
plural image bearing members which are disposed in an oblique direction with respect to a horizontal direction of said image forming apparatus, said plural image bearing members including at least first, second, third and fourth image bearing members, disposed obliquely in order, wherein said first image bearing member is disposed most closely to a predetermined face of a casing of said image forming apparatus, and wherein said fourth image bearing member is disposed most remotely from said predetermined face; and
a deflecting and scanning device disposed between said plural image bearing members and said predetermined face, said deflecting and scanning device for scanning plural laser beams including at least first, second, third and fourth laser beams, wherein said first laser beam reaches said first image bearing member, said second laser beam reaches said second image bearing member, said third laser beam reaches said third image bearing member, and said fourth laser beam reaches said fourth image bearing member, respectively, wherein said deflecting and scanning device comprises:

a rotary polyhedral mirror which scans each of said plural image bearing members by deflecting respectively different ones of said plural laser beams toward respective ones of said plural image bearing members;

a first plurality of reflecting members for reflecting corresponding ones of said plural laser beams deflected and scanned by said rotary polyhedral mirror in directions away from said plural image bearing members, and a second plurality of reflecting members for reflecting corresponding ones of said plural laser beams reflected by corresponding ones of said first plurality of reflecting members in a direction toward said plural image bearing members;

a first optical path of said first laser beam emitted to said first image bearing member;

a second optical path of said second laser beam emitted to said second image bearing member;

a third optical path of said third laser beam emitted to said third image bearing member;

a fourth optical path of said fourth laser beam emitted to said fourth image bearing member;

wherein said first and second laser beams are deflected and scanned in a reverse direction of a direction in which said third and fourth laser beams are deflected and scanned, with respect to the rotary polyhedral mirror, wherein a part of said first optical path emitted from said rotary polyhedral mirror to said first reflecting member is disposed more closely to said plural image bearing members than a part of said second optical path emitted from said rotary polyhedral mirror to said first reflecting member, and wherein a part of said fourth optical path emitted from said rotary polyhedral mirror to said first reflecting member is disposed more closely to said predetermined face than a part of said third optical path emitted from said rotary polyhedral mirror to said first reflecting member.

2. An image forming apparatus according to claim 1, wherein the first laser beam incidents on the rotary polyhedral mirror obliquely with respect to the second laser beam, and wherein the third laser beam incidents on the rotary polyhedral mirror obliquely with respect to the fourth laser beam.

\* \* \* \* \*